(12) United States Patent
Endo et al.

(10) Patent No.: US 6,559,841 B2
(45) Date of Patent: *May 6, 2003

(54) THREE-DIMENSIONAL SHAPE EXTRACTING METHOD, APPARATUS AND COMPUTER MEMORY PRODUCT

(75) Inventors: Susumu Endo, Kawasaki (JP); Masaki Watanabe, Kawasaki (JP); Shuichi Shiitani, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,713

(22) Filed: Dec. 21, 1998

(65) Prior Publication Data
US 2001/0045950 A1 Nov. 29, 2001

(30) Foreign Application Priority Data
Feb. 27, 1998 (JP) .......................................... 10-048432

(51) Int. Cl.$^7$ ............................................... G06T 17/00
(52) U.S. Cl. ...................................... 345/420; 345/441
(58) Field of Search ................................ 345/418, 419, 345/420, 421, 422, 429, 433, 441, 442, 443, 581, 619, 672, 423, 643; 382/154, 203; 700/98, 119

(56) References Cited

U.S. PATENT DOCUMENTS

| | | | | |
|---|---|---|---|---|
| 4,721,952 A | * | 1/1988 | Huber | ........................ 340/729 |
| 5,742,294 A | * | 4/1998 | Watanabe et al. | ........... 345/672 |

FOREIGN PATENT DOCUMENTS

| | | | | |
|---|---|---|---|---|
| JP | 7-262410 | | 10/1995 | |
| JP | 9-97354 | | 4/1997 | |
| JP | 9-97355 | | 4/1997 | |
| JP | 9-270015 | | 10/1997 | |
| JP | 10031753 A | * | 2/1998 | ........... G06T/15/00 |

OTHER PUBLICATIONS

Foley et al (Computer Graphics: Principles and Practice: 1996); ISBN: 0–201–84840–6—Section 15.4.*
Doug King (Picture–Perfect Models, Computer Graphics World vol.20 Issue:nl—Jan. 1, 1997).*

* cited by examiner

Primary Examiner—Mano Padmanabhan
(74) Attorney, Agent, or Firm—Staas & Halsey LLP

(57) ABSTRACT

From a two-dimensional image of an object displayed on a screen, a three-dimensional shape of the object is easily extracted. A normal vector with respect to a surface of the object in a three-dimensional system corresponding to one surface of the columnar object displayed as the two-dimensional image on the screen and three-dimensional coordinates of at least one point included in the surface are calculated, and based on the calculation result, the surface is extracted, a height of the columnar body having the surface as its bottom is set to form an object.

20 Claims, 5 Drawing Sheets

DIRECTION OF NORMAL VECTOR (ORIGIN)

THREE-DIMENSIONAL SHAPE EXTRACTING METHOD, APPARATUS AND COMPUTER MEMORY PRODUCT

BACKGROUND OF THE INVENTION

The present invention relates to a method and an apparatus for extracting a three-dimensional shape of an object based on a two-dimensional image displayed on a screen, and to a memory product recording a computer program of the extracting process.

In recent years, with development of multimedia, a processing which handles image taken by a camera is increasing. As one of such processing, there is a processing for extracting a three-dimensional shape of an object from a two-dimensional image of the object displayed on a screen. As such an extracting method of the three-dimensional shape, a method for applying a three-dimensional model (a first conventional example) and a method for designating a three-dimensional axis (a.second conventional example) are known.

In the first conventional example, a three-dimensional shaped model (basic model) such as a cube, a column and a sphere is prepared as an original form, a projective image of the corresponding basic model and an actual picture image of the object are displayed side by side on the screen, both the images are visually compared to designate a relative position, and a three-dimensional shape of the object is extracted by rotating the basic model or by correcting the basic model to change its size.

Further, in the second conventional example, three-dimensional X, Y and Z axes are designated, two-dimensional coordinates of an actual picture image of the object on the screen is converted into three-dimensional coordinates designated using measured focal length, thereby extracting a three-dimensional shape of the object.

In the first conventional example, the correction of the basic model depends on judgement of an operator, and there is a problem that a skilled technique of the operator is required to extract an accurate three-dimensional shape. Further, in the second conventional example, it is necessary to estimate the three-dimensional coordinate system, to retrieve corresponding points, and to conduct the coordinate conversion of the retrieved points and therefore, there is a problem that it takes a long time for processing. Under such an circumstance, development of easy shape extracting method of a three-dimensional object having a relatively simple shape is desired. Further, in any of these conventional examples, measurement of a focal length of an actual picture image which is indispensable to the extracting processing of a three-dimensional shape can not be conducted at the same time, and there is a problem that the focal length must be measured by another technique.

BRIEF SUMMARY OF THE INVENTION

An object of the present invention is to provide three-dimensional shape extracting method and apparatus capable of extremely easily extracting a three-dimensional shape of an object without applying processing of a basic model, retrieving processing of the corresponding points and a skilled technique, by inputting a contour of a surface and geometrical information of the surface of an image of the object, and to provide a computer memory product recording a program for causing a computer to execute the extracting processing.

Another object of the invention is to provide three-dimensional shape extracting method and apparatus capable of simultaneously calculating the focal length in a process of the extracting processing of the three-dimensional shape.

According to the present invention, a contour of one surface of an object displayed on a screen as a two-dimensional image and geometrical information of the surface (such as a square, a hexagon and a circle) are input, and based on the input contour and geometrical information of the surface, a normal vector with respect to a surface of the object in the three-dimensional system and three-dimensional coordinates of one point on the surface are obtained, and one surface of the object in the three-dimensional system is extracted by these obtained parameters. Then, the extracted surface is defined as a bottom surface to determine its height, thereby extracting a three-dimensional shape of the object.

In this manner, according to the present invention, a three-dimensional shape of an.object of columnar shape such as a cube, a hexagonal shape, a column can easily be extracted in a short time only by inputting the contour of a surface and geometrical information of the surface. Further, when the normal vector is obtained, the focal length is also calculated and thus, the focal length information can simultaneously be obtained without using another special technique.

The above and further objects and features of the invention will more fully be apparent from the following detailed description with accompanying drawings.

DETAILED DESCRIPTION OF THE INVENTION

The present invention will be described in detail based on the accompanying drawings showing an example of the invention below.

Figure 1:
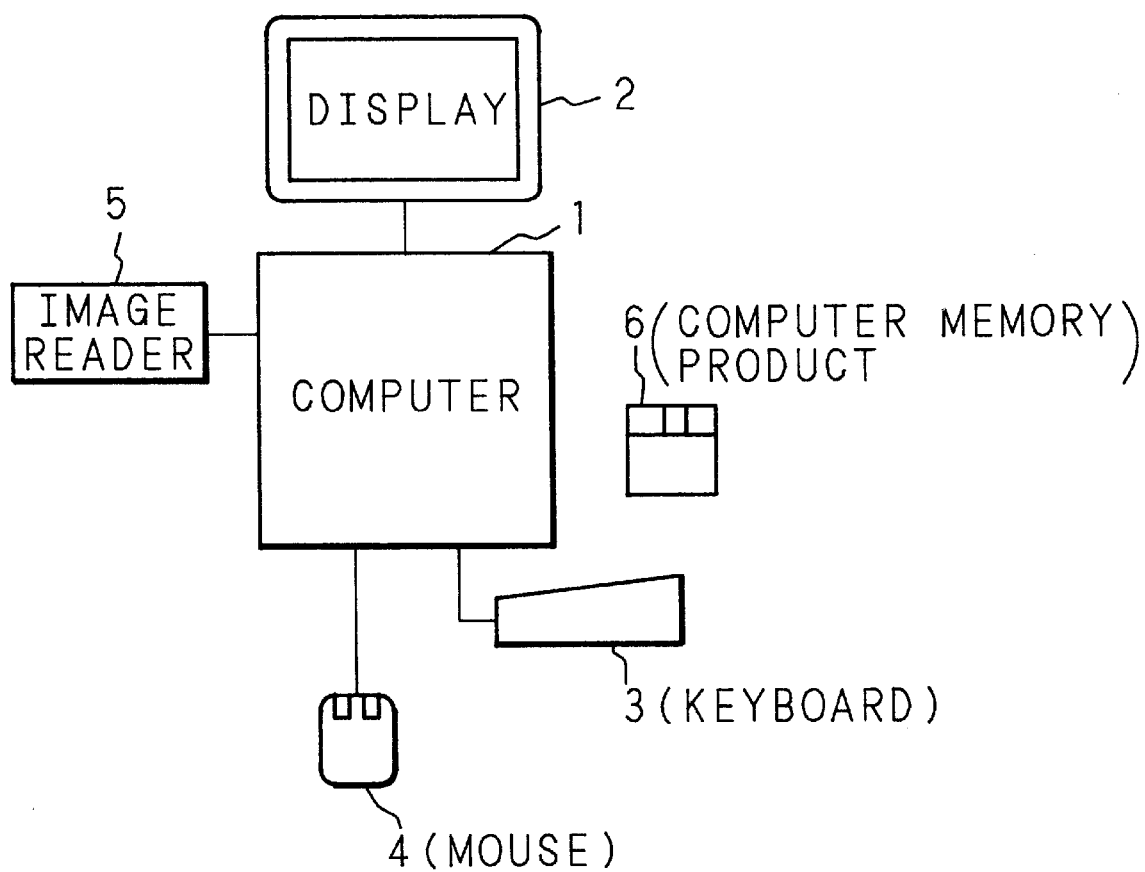
FIG. 1 is a view showing a structure of hardware of a system for carrying out extracting process of a three-dimensional shape of the present invention.

FIG. 1 is a view showing a structure of hardware of a system for carrying out extracting process of a three-dimensional shape of the present invention. This system comprises a computer 1, a display 2, a keyboard 3, a mouse 4 and an image reader 5.

The computer 1 loads a program which carries out processing such as calculating a focal length and a normal vector and specifying a surface shape, from a computer memory product 6 such as a magnetic disk in which the program is stored. A software for executing the processing may be installed in the computer 1.

The image reader 5 inputs two-dimensional image information of an object which is to be extracted. The display 2 displays an image of the object in accordance with this two-dimensional image information and a two-dimensional image of the object which is being extracted. The image information of the object may be input to the computer 1 using a video camera instead of the image reader 5. Further, it is also possible to supply the image from a memory product such as an optical disk to the computer 1. The keyboard 3 and the mouse 4 function as external input devices for an operator. Another pointing device such as a track ball may be used instead of the mouse 4.

Figure 2:
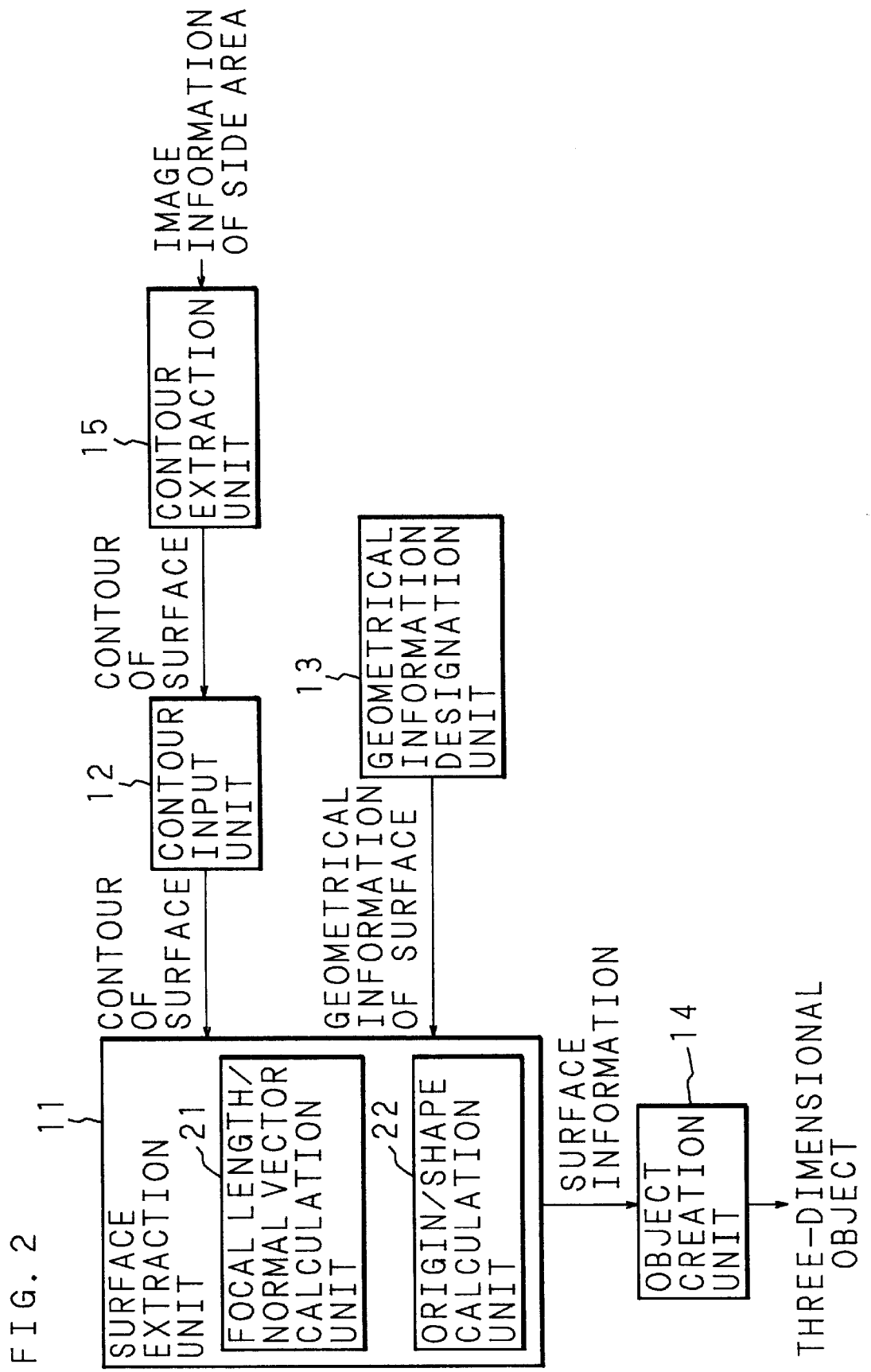
FIG. 2 is a functional block diagram of a computer.

FIG. 2 is a functional block diagram of the computer 1. The computer 1 comprises a surface extraction unit 11, a contour input unit 12, a geometrical information designation unit 13, an object creation unit 14 and a contour extraction unit 15. The surface extraction unit 11 includes a focal length/normal vector calculation unit 21 and an origin/shape calculation unit 22. In the following description, a three-dimensional object to be extracted is a rectangular parallelepiped.

If an area of each of sides (four sides) of one surface of a rectangular object displayed on the display 2 is designated by the mouse 4, image information of the side area is input to the contour extraction unit 15, the contour extraction unit 15 extracts one surface contour by processing the image information to extract the sides, and output the surface contour to the contour input unit 12. The contour input unit 12 sends the input surface contour to the surface extraction unit 11.

In the geometrical information designation unit 13, geometrical information of the surface (this information means rectangle in the present embodiment) is previously input, and the geometrical information designation unit 13 outputs this geometrical information to the surface extraction unit 11. Change in input of the surface geometrical information with respect to the geometrical information designation unit 13 can be made by an operator using the keyboard 3 and the mouse 4.

The surface extraction unit 11 extracts one surface of the three-dimensional object to be extracted, in accordance with the contour of the surface input from the contour input unit 12, and the geometrical information of the surface input from the geometrical information designation unit 13. The focal length/normal vector calculation unit 21 in the surface extraction unit 11 calculates the focal length of the two-dimensional image displayed on the display 2 using the contour of the surface and the geometrical information of the surface, and also calculates a normal vector with respect to a surface of the three-dimensional system from a result of the calculation. Using the calculated focal length and the two-dimensional coordinates of four vertexes of the surface on the display 2, the origin/shape calculation unit 22 calculates coordinates (origin) of one of the vertexes in the three-dimensional coordinate system. A surface specified by the three parameters (a normal vector, an origin and a shape) calculated in this manner is extracted, and is output to the object creation unit 14.

The object creation unit 14 extracts one side perpendicular to the extracted surface to obtain its length, sets the obtained length as a height of the rectangular parallelepiped having the extracted surface as its bottom surface, thereby extracting the three-dimensional shape of the object to form a three-dimensional object.

Figure 3:
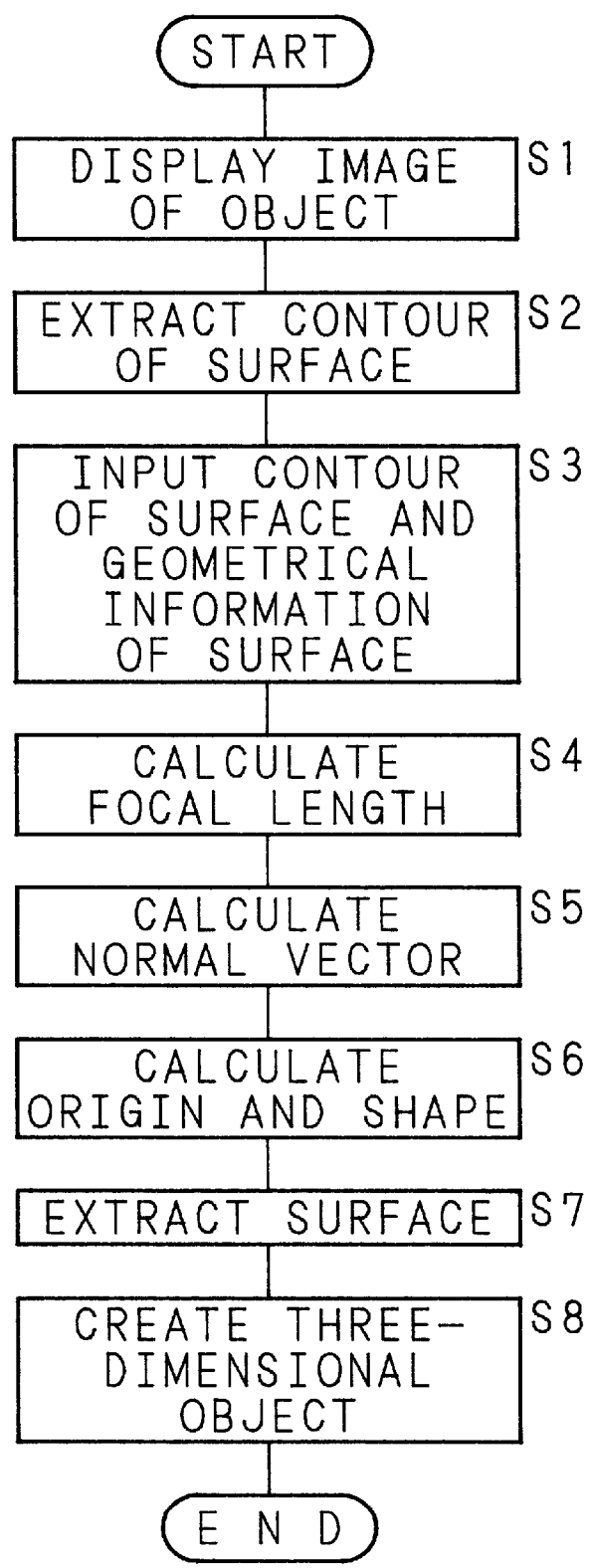
FIG. 3 is a flowchart showing operational procedure of the invention.
Figure 4:
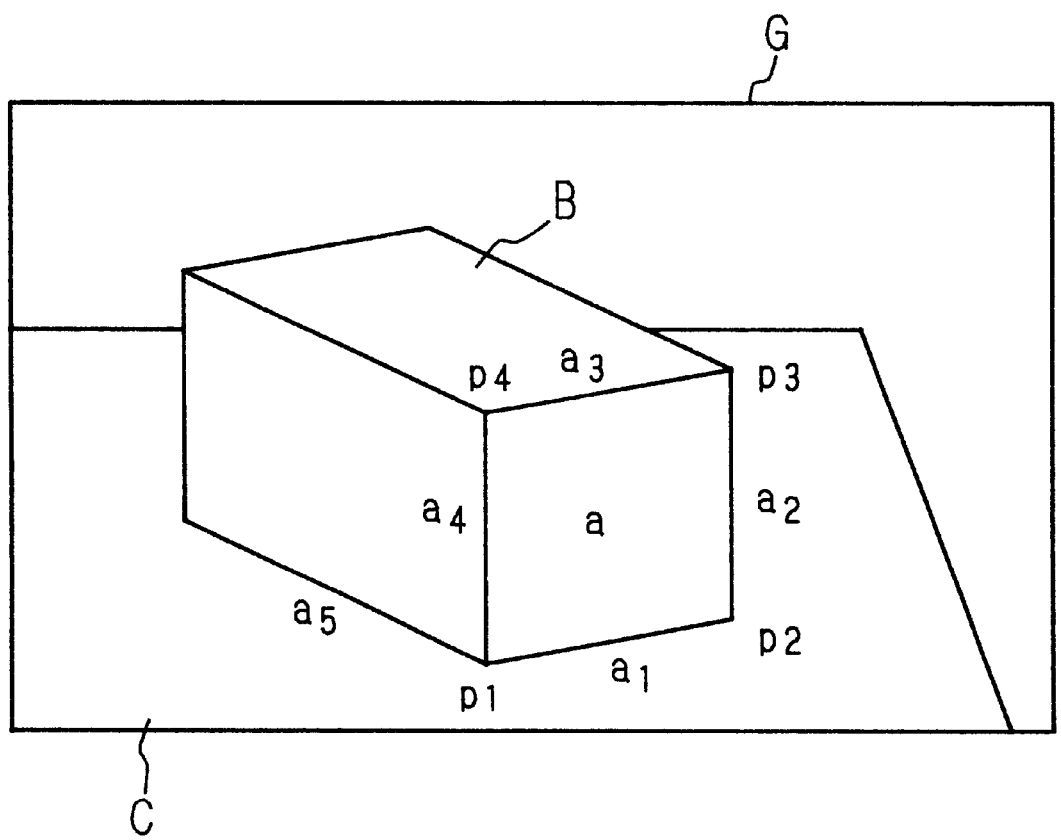
FIG. 4 is a diagram showing an example of displaying a two-dimensional image.
Figure 5A:
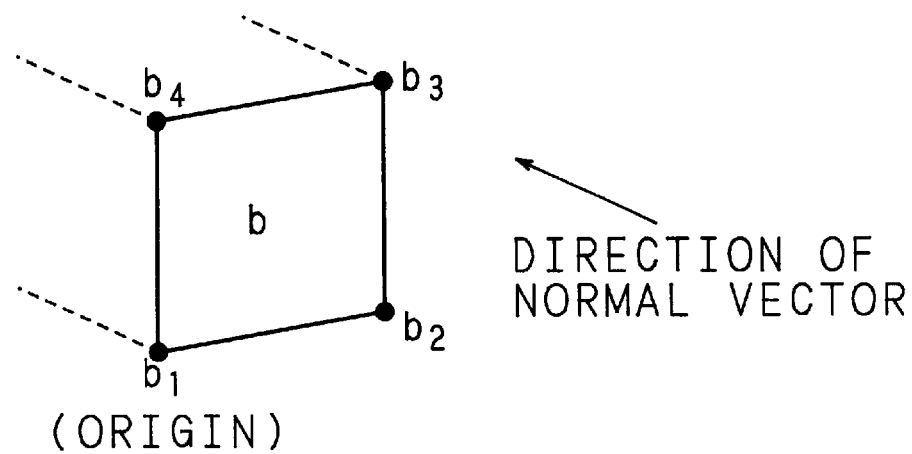
FIGS.5A and 5B are views for explaining the extracting process of a three-dimensional shape of the invention.
Figure 5B:
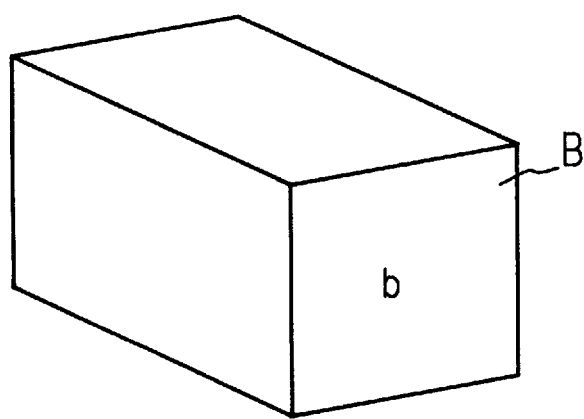

Next, an operation will be explained. FIG. 3 is a flowchart showing operational procedure of the invention, FIG. 4 is a diagram showing an example of displaying a two-dimensional image, and FIGS. 5A and 5B are views for explaining the extracting process of a three-dimensional shape of the invention.

First, two-dimensional image information of an object to be extracted is input from the image reader 5, and an image of the object in accordance with the image information is displayed on the display 2 (step S1). An image G shown in FIG. 4 is an image showing a rectangular parallelepiped object B to be extracted which is placed on a table C. If the operator points, with the mouse 4, areas of four sides $a_1$, $a_2$, $a_3$ and $a_4$ constituting one surface (a in FIG. 4) of the object B displayed on the display 2, the image information of this area is input to the contour extraction unit 15, a contour of the one rectangular surface a is extracted by processing this image information (step S2). The contour of the extracted surface a means a map of the one surface of the rectangular parallelepiped object B displayed on the display 2 in two-dimensional plan.

The extracted contour of the surface and the geometrical information of the rectangular surface input to the geometrical information designation unit 13 are input to the surface extraction unit 11 (step S3). In the surface extraction unit 11, a focal length and a normal vector are sequentially calculated from the vertexes information of the extracted rectangle in the focal length/normal vector calculation unit 21 first (steps S4 and S5). A concrete calculation method will be explained below.

If four points $p_1$ $(x_1, y_1)$, $p_2$ $(x_2, y_2)$, $p_3$ $(x_3, y_3)$ and $p_4$ $(x_4, y_4)$ are provided on the two-dimensional coordinate system, and a rectangle is constituted on the three-dimensional coordinate system by the four points, a focal length and a normal vector can be obtained using an arbitrary constant $f_a > 0$.

Suppose N vector of each of the points are designated as $m_1$, $m_2$, $m_3$ and $m_4$, each vector can be expressed as follows: wherein N[ ] means normalization of vector.

$m_1 = N[x_1, y_1, f_a]$  $m_2 = N[x_2, y_2, f_a]$
$m_3 = N[x_3, y_3, f_a]$  $m_4 = N[x_4, y_4, f_a]$

Further, suppose N vector of each of the sides is defined as $n_1$, $n_2$, $n_3$ and $n_4$, each vector is as follows. For example, a side between $m_1 = (M_{11}, M_{12}, M_{13})$, $m_2 = (M_{21}, M_{22}, M_{23})$ is defined as $n_1$, $n_1$ is concretely expressed as follows:

$$n_1 = N\left[\begin{array}{c} M_{13}M_{22} - M_{23}M_{12} \\ M_{11}M_{23} - M_{12}M_{13} \\ M_{11}M_{22} - (M_{12})^2 \end{array}\right]$$

Similarly, suppose a side between $m_2$, $m_3 = (M_{31}, M_{32}, M_{33})$ is defined as $n_2$; a side between $m_3$, $m_4 = (M_{41}, M_{42}, M_{43})$ is defined as $n_3$; and a side between $m_4$, $m_1$ is defined as $n_4$; $n_2$, $n_3$ and $n_4$ are concretely expressed as follows:

$$n_2 = N\left[\begin{array}{c} M_{23}M_{32} - M_{33}M_{22} \\ M_{21}M_{33} - M_{22}M_{23} \\ M_{21}M_{32} - (M_{22})^2 \end{array}\right]$$

$$n_3 = N\left[\begin{array}{c} M_{33}M_{42} - M_{43}M_{32} \\ M_{31}M_{43} - M_{32}M_{33} \\ M_{31}M_{42} - (M_{32})^2 \end{array}\right]$$

$$n_4 = N\left[\begin{array}{c} M_{43}M_{12} - M_{13}M_{42} \\ M_{41}M_{13} - M_{42}M_{43} \\ M_{41}M_{12} - (M_{42})^2 \end{array}\right]$$

By the $n_1$, $n_2$, $n_3$ and $n_4$ obtained in this manner, the focal length f can be calculated as follows:

$p_1 = (p_{11}, p_{12}, p_{13}) = N[n_1 \times n_3]$ $p_2 = (p_{21}, p_{22}, p_{23}) = N[n_2 \times n_4]$ $$f = f_a \sqrt{-\frac{(p_{11}p_{21} + p_{12}p_{22})}{p_{13}p_{23}}}$$

Using $p_1$ and $p_2$ calculated by supposing that $f_a$ is equal to f, a normal vector P of plan including this rectangle can be obtained as follows:

$$P = p_1 \times p_2$$

With this calculation, although a direction of the normal vector can not be determined, if it is supposed that the surface a is visible on the screen, it is possible to determine the direction of the normal vector into one direction.

Further, by obtaining the three-dimensional coordinates of the four points of the surface (rectangle), the origin and the shape of the surface are calculated by the origin/shape calculation unit 22 (step S6). A concrete equation of the coordinate conversion is as follows: a point indicated by (x,y) in the two-dimensional coordinate system is expressed by (Z·x/f, Z·y/f, Z) in three-dimensional coordinate system, wherein Z represents Z coordinates, and f represents a focal length.

A rectangle specified by the three parameters (normal vector, origin and shape) calculated in the above described manner is extracted and output to the object creation unit 14 (step S7).

The direction of the rectangle in the image on the display 2 is determined by the normal vector, and it is possible to extract a surface (rectangle) b constituted by four vertexes $b_1$, $b_2$, $b_3$ and $b_4$ which is exactly superposed on the surface (rectangle) a in the image by the parameters of the origin and the shape (see FIG. 5A).

Then, the object creation unit 14 extracts one side ($a_5$ in FIG. 4, for example) which is perpendicular to the extracted surface b by the image processing to obtain a length of the extracted side. The obtained length is set as a height of the rectangle having the extracted surface as its bottom surface, and a three-dimensional shape of the object B is extracted to form a three-dimensional object (step S8, see FIG. 5B).

Although the surface contour is extracted by extracting the sides by the image processing in the above described example, a surface contour corresponding to the rectangle on a two-dimensional image may be extracted by clicking the vertexes of the rectangle by the mouse 4.

Further, although the backward side is extracted to set the height of the rectangle in the above example, the operator may manually adjust using an appropriate length such that a surface is exactly superposed on the object B of the existing two-dimensional image after the surface is extracted.

Furthermore, although the object is a rectangular parallelepiped in the above example, this is only an example, and even if the shape of the object is another prism such as a triangular prism and a hexagonal prism, or a column, its three-dimensional shape can be extracted in the same manner.

As described above, according to the present invention, it is possible to extract a three-dimensional shape of an object only by inputting a contour and geometrical information of a surface on a display. Therefore, a three-dimensional shape can extremely easily be extracted without an applying process of a basic model, retrieving process of corresponding point and skilled technique unlike the conventional technique.

Further, when a normal vector is obtained, a focal length can also be calculated, a focal length information can simultaneously be obtained without using another special technique, which is convenient.

As this invention may be embodied in several forms without departing from the spirit of essential characteristics thereof, the present embodiment is therefore illustrative and not restrictive, since the scope of the invention is defined by the appended claims rather than by the description preceding then, and all changes that fall within metes and bounds of the claims, or equivalence of such meters and bounds thereof are therefore intended to be embraced by the claims.

What is claimed is:

1. A method for extracting a three-dimensional shape of an object based on a two-dimensional image of the object, comprising:

obtaining a contour of one surface of the two-dimensional image of the object;

obtaining geometrical information of an actual shape of the one surface of the object; and extracting a second surface having the obtained surface contour and corresponding to the one surface of the two-dimensional image so as to extract the three-dimensional shape of the object corresponding to the one surface based on the obtained surface contour and the obtained information.

2. The method for extracting the three-dimensional shape according to claim 1, wherein said surface extracting further comprises:

calculating a normal vector with respect to the second surface to be extracted, and calculating three-dimensional coordinates of at least one point included in the second surface to be extracted.

3. The method for extracting the three-dimensional shape according to claim 1, further comprising determining a height of the object having the extracted second surface as its bottom surface, based on the two-dimensional image of the object.

4. The method for extracting the three-dimensional shape according to claim 1, wherein the object is a cubic body selected from a group consisting of a prism and a column.

5. An apparatus for extracting a three-dimensional shape of an object based on a two-dimensional image of the object, comprising:

obtaining means for obtaining a contour of one surface of the two-dimensional image of the object;

holding means for holding geometrical information of an actual shape of the one surface of the object; and extracting means for inputting the obtained surface contour and the surface shape geometrical information, and based on which, extracting a second surface having the obtained surface contour corresponding to the one surface of the two-dimensional image and extracting the three-dimensional shape of the object corresponding to the one surface.

6. The apparatus for extracting the three-dimensional shape according to claim 5, wherein:

said extracting means includes:
means for calculating a normal vector with respect to the second surface to be extracted, and
means for calculating three-dimensional coordinates of at least one point included in the second surface to be extracted, and said extracting means extracts the corresponding second surface based on the calculated normal vector and three-dimensional coordinates.

7. The apparatus for extracting the three-dimensional shape according to claim 5, further comprising means for determining a height of the object having the extracted second surface as its bottom surface, based on the two-dimensional image of the object.

8. The apparatus for extracting the three-dimensional shape according to claim 5, wherein:
said obtaining means includes means for extracting a side of the two-dimensional image of the object, and
said obtaining means obtains the contour of the one surface in accordance with the extraction result.

9. The apparatus for extracting the three-dimensional shape according to claim 5, wherein said holding means holds geometrical information selected from a group consisting essentially of a polygon and a circle.

10. A computer memory product having machine readable program code for causing a computer to implement a method of extracting a three-dimensional shape of an object based on a two-dimensional image of the object, the method comprising:
causing the computer to calculate, based on a contour of one surface of the two-dimensional image of the object and geometrical information of an actual shape of the one surface of the object which are input to the computer, a normal vector with respect to a second surface to be extracted, the second surface corresponding to the one surface;
causing the computer to calculate three-dimensional coordinates of at least one point included in the corresponding second surface to be extracted based on the surface contour and the surface shape geometrical information; and
causing the computer to extract into the third dimension the corresponding second surface based on the calculated normal vector and three-dimensional coordinates to obtain the three-dimensional shape of the object.

11. The computer memory product according to claim 10, further comprising:
causing the computer to determine a height of the object having the extracted second surface as its bottom surface, based on the two-dimensional image of the object.

12. A computer memory product having machine readable program code for causing a computer to implement a method of extracting a three-dimensional shape of an object based on a two-dimensional image of the object, the method comprising:
causing the computer to obtain a contour of one surface of the two-dimensional image of the object;
causing the computer to calculate a normal vector with respect to a second surface to be extracted corresponding to the one surface based on the obtained surface contour and input geometrical information of an actual shape of the one surface of the object;
causing the computer to calculate three-dimensional coordinates of at least one point included in the corresponding second surface to be extracted based on the surface contour and the surface shape geometrical information; and
causing the computer to extract the corresponding second surface into the third dimension based on the calculated normal vector and three-dimensional coordinates.

13. The computer memory product according to claim 12, further comprising: causing the computer to determine a height of the object having the extracted second surface as its bottom surface, based on the two-dimensional image of the object.

14. An apparatus for extracting a three-dimensional shape of an object based on a two-dimensional image of the object, comprising:
a contour unit to obtain a contour of one surface of the two-dimensional image of the object;
a holding unit to hold geometrical information of an actual shape of the one surface of the object; and
a surface extractor unit to input the obtained surface contour and the surface shape geometrical information, and based on which, to extract a second surface of the object corresponding to the one surface and having the obtained surface contour.

15. The apparatus for extracting the three-dimensional shape according to claim 14, wherein
said surface extractor unit includes
a normal vector calculation unit to calculate a normal vector with respect to the second surface to be extracted, and
a shape calculation unit to calculate three-dimensional coordinates of at least one point included in the second surface to be extracted, and
said surface extractor unit extracts the corresponding second surface based on the calculated normal vector and three-dimensional coordinates.

16. The apparatus for extracting the three-dimensional shape according to claim 14, further comprising:
an object creation unit to determine a height of the object having the extracted second surface as its bottom surface, based on the two-dimensional image of the object.

17. The apparatus for extracting the three-dimensional shape according to claim 14, wherein
said contour unit includes a contour extraction unit to extract a side of the two-dimensional image of the object, and obtains a contour of the one surface in accordance with the extraction result.

18. The apparatus for extracting the three-dimensional shape according to claim 14, wherein
said holding unit holds geometrical information selected from a group consisting essentially of a polygon and a circle.

19. A method for extracting a three-dimensional shape of an object based on a two-dimensional image of the object, the method comprising:
obtaining a contour of a surface of the two-dimensional image of the object having the surface;
obtaining geometrical information of an actual shape of the obtained surface of the object;
using the obtained contour and the obtained geometrical information of the surface, calculating a normal vector with respect to the surface, three-dimensional coordinates of one point included in the surface, and a shape of the surface; and
extracting a second surface into a three-dimensional system, the extracted second surface corresponding to the surface based upon the calculated normal vector, the calculated three-dimensional coordinates of the one point, and the calculated shape of the surface.

20. The method according to claim 19, further comprising determining a height of the object based on the two-dimensional image of the object wherein the extracted second surface is a bottom of the object.

* * * * *